J. O. CAMPBELL.
Fishing Stakes.
No. 144,888. Patented Nov. 25, 1873.
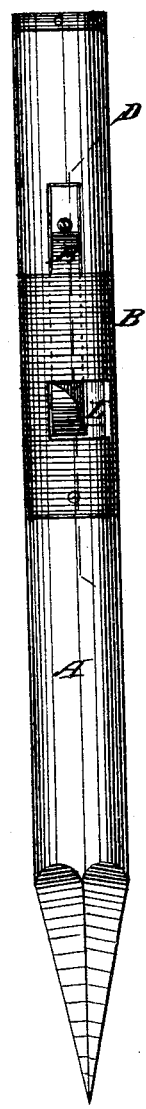
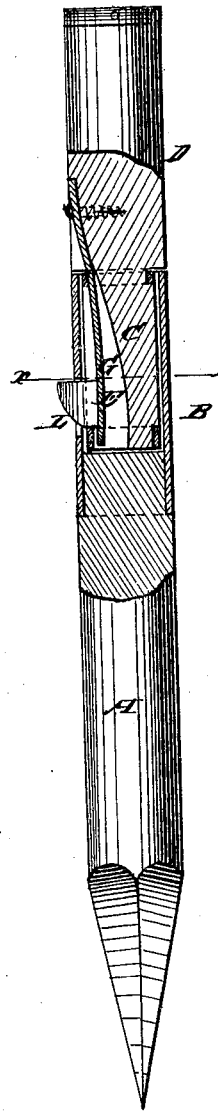
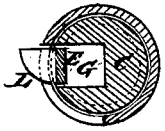
Witnesses:
Inventor:
J. O. Campbell
Per
Attorneys.

UNITED STATES PATENT OFFICE.

JOHN O. CAMPBELL, OF ALPENA, MICHIGAN.

IMPROVEMENT IN FISHING-STAKES.

Specification forming part of Letters Patent No. 144,888, dated November 25, 1873; application filed May 24, 1873.

*To all whom it may concern:*

Be it known that I, JOHN O. CAMPBELL, of Alpena, in the county of Alpena and State of Michigan, have invented a new and Improved Fishing-Stake, of which the following is a specification:

My invention consists of a fishing-stake composed of two parts connected together by a socket and spring-catch, in such manner that the upper portion can be readily detached from the lower portion, just above the ground when the season is over, to be preserved, and then be readily attached again at the beginning of another season, and thus save the great labors necessary to pull up the stakes at the close of each season, and drive them down again at each returning season.

Figure 1 is a side elevation of a fishing-stake constructed according to my invention. Fig. 2 is a sectional elevation, and Fig. 3 is a cross-section, on the line $x\ x$ of Fig. 2.

Similar letters of reference indicate corresponding parts.

A is the part to be driven into the ground. B is a short metal tube fitted onto the upper end, and projecting above to form a socket for the reception of the lower reduced end C of the upper part D, which has a spring-catch, E, so as to be pressed into the groove G, when the upper part is to be connected to the lower one, and spring out through the hole L in the socket.

This catch is readily sprung back when the top part of the stake is to be taken off.

Having thus described my invention, I claim as new and desire to secure by Letters Patent—

A fishing-stake consisting of two parts, A D, detachably connected together by a socket, B, and spring-catch E, substantially as specified.

JOHN O. CAMPBELL.

Witnesses:
 CHAS. N. CORNELL,
 T. S. MARKHAM.